June 8, 1965  S. L. STILLMAN, JR  3,188,381
QUICK-DISCONNECT CABLE CLAMP
Filed June 16, 1961  2 Sheets-Sheet 1

INVENTOR.
STEPHEN L. STILLMAN JR.
BY

June 8, 1965
S. L. STILLMAN, JR
3,188,381
QUICK-DISCONNECT CABLE CLAMP
Filed June 16, 1961
2 Sheets-Sheet 2
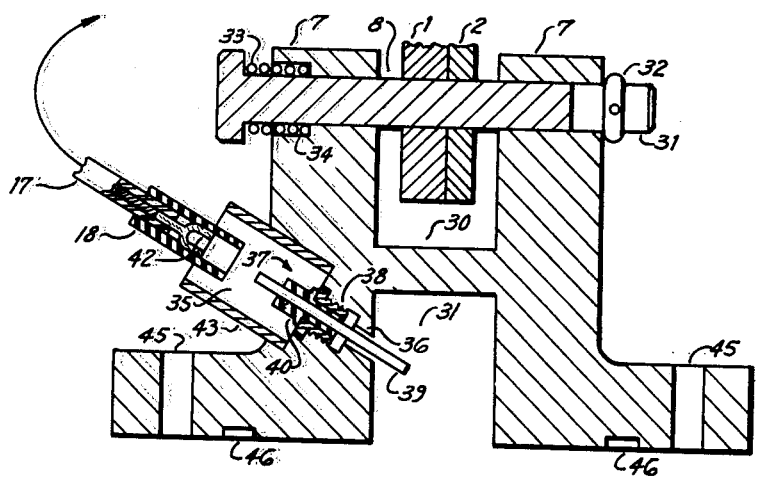
INVENTOR.
STEPHEN L. STILLMAN JR.
BY

United States Patent Office 3,188,381
Patented June 8, 1965

3,188,381
QUICK-DISCONNECT CABLE CLAMP
Stephen L. Stillman, Jr., North Falmouth, Mass., assignor to the United States of America as represented by the Secretary of the Navy
Filed June 16, 1961, Ser. No. 117,761
4 Claims. (Cl. 174—92)

The present invention relates generally to apparatus for and methods of securing armored concentric electrical cables to underwater objects operating at great depths and, more particularly, to a quick disconnect cable clamp which can withstand extremely high water pressures.

In oceanographic research it is often necessary to lower to or tow electrical equipment at extremely great depths from surface vessels or aircraft. To simplify the lowering or towing procedure, the cable may be designed with an outer stranded, steel sheath for providing the necessary tensile strength, and an insulated, concentric electrical conductor for providing the electrical link to the remote detecting apparatus. At the terminal end of this type of line, a cable clamp is usually employed both to secure the steel strands to the lowered or towed member and to maintain electrical continuity between the concentric conductor and the electrical portions of this device. The cable clamp thus establishes two connections, one mechanical and one electrical. Because of the environment in which the electrical measuring apparatus may work, the electrical connection must be capable of withstanding extremely high water pressures. To meet this requirement, some of the prior art cable clamps have resorted to oil-filled mechanical pressure chambers and pressure equalizing, oil-filled rubber tubes, which components, together with their complementary clamps, make the complete apparatus relatively heavy, bulky and difficult to assemble. Furthermore, special tools and experienced personnel are usually needed and considerable time must be spent in detaching the towing cable from the clamp and the clamp, in turn, from the towed apparatus when the electrical characteristics of the towing cable are to be tested and/or the electrical performance of the detecting apparatus monitored.

It is accordingly a primary object of the present invention to provide a cable clamp for facilitating the connection of armored concentric electrical cables to underwater objects which operate at relatively great depths.

Another object of the present invention is to provide a cable clamp for receiving and anchoring the terminal end of an armored-type concentric conductor to an underwater electrical device.

A still further object of the present invention is to provide a quick disconnect cable clamp for use with electrical cables protected with high tensile steel strands.

A still further object of the present invention is to provide a cable clamp which has a quick disconnect feature.

A still further object of the present invention is to provide a cable clamp for concentric electrical cables having armored sheaths which can be readily assembled and disassembled without special tools and in an extremely short time.

A still further object of the present invention is to provide a waterproof cable clamp for use with armored concentric electrical cables.

A still further object of the present invention is to provide a quick disconnect cable clamp which can operate at high pressures and has a holding power approaching the breaking strength of the steel reinforced electrical cable to which it is attached.

Other objects and many of the attendant advantages of this invention will be readily appreciated as the same becomes better understood by reference to the following detailed description when considered in connection with the accompanying drawings wherein:

FIG. 4 is a transverse sectional view on line 1—1 of FIG. 3; and

FIG. 5 is a sectional view taken along the plane of symmetry of the base member showing the clevis pin in its assembled position.

Briefly and in somewhat general terms, the above objects are achieved according to one preferred embodiment by utilizing as the cable clamping means a pair of rectangular plates, one of which has a tortuous groove cut in one face thereof to accommodate a terminating length of the armored cable and the other of which has an elevated grooved channel which is a mirror image of the aforementioned groove formed in one face thereof to envelop the exposed portion of the armored cable when it is disposed within the other groove. One of these plates also has a pair of wells cut in its face which are interconnected by a cable groove. The steel stranding of the cable is removed at the first well and the electrical splice joining the concentric conductor to a connecting jumper is made in the second well. In order to make this electrical splice waterproof at high pressures, the well is simply filled with a plastic, moldable compound which completely encapsulates the splice. Both clamping plates are secured together and pivotally mounted about an eccentric point by means of a clevis pin which cooperates with a base member that is, in turn, affixed to the towing apparatus. A second electrical connection is made at this base with a push-pull type connector. This additional disconnector simplifies the electrical testing procedure and, at the same time, permits a single towing line terminating in a pair of clamping blocks of the type above described to be used with different measuring instruments, each of which has a base member permanently attached thereto.

Figure 1:
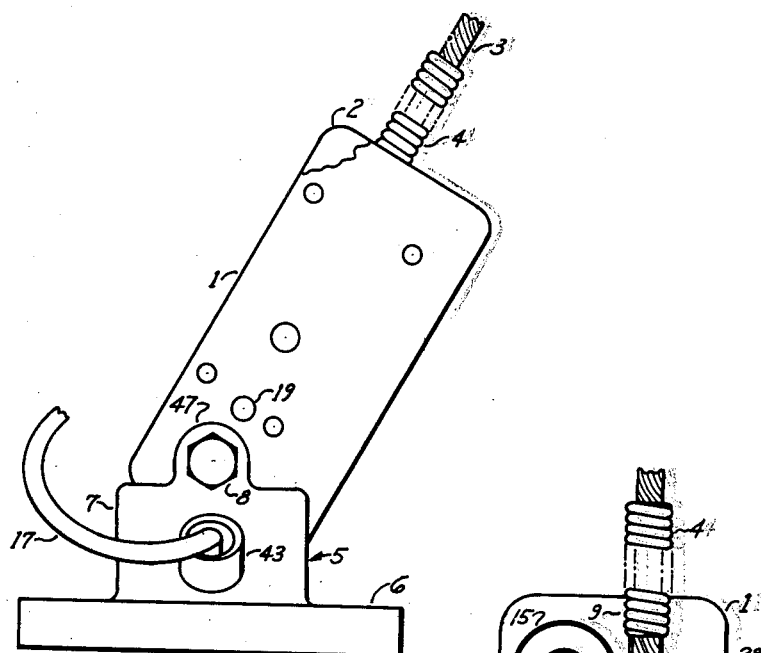
FIG. 1 is a side elevation of a preferred embodiment of the present invention.

Referring now to FIG. 1 of the drawings, the high pressure disconnect cable clamp of the present invention is seen to comprise generally a pair of essentially rectangular, metallic, clamping blocks 1 and 2 of unequal thickness, into one end of which the outboard end of a steel-stranded, concentric, electric cable 3 is fed. These blocks, the details of which will be described hereinafter, have cooperating threaded semi-circular depressions cut in corresponding ends thereof for accepting a whip spring 4 made of, for example, stainless steel spring-tempered wire. This coil spring prevents cutting of the neoprene insulation due to collapse of the steel cable strands from sharp bending by restricting the minimum radius of the cable to a preselected dimension at the point where it enters the clamping blocks. The other major component of the cable clamp is base member 5 which has a cylindrical base portion 6 and a pair of spaced, upstanding posts 7, only one of which can be seen in this figure, projecting therefrom. These posts are journaled near their top to receive a spring-loaded clevis pin 8 which serves as the shaft about which the clamping blocks pivot in the towing direction.

Figure 2:
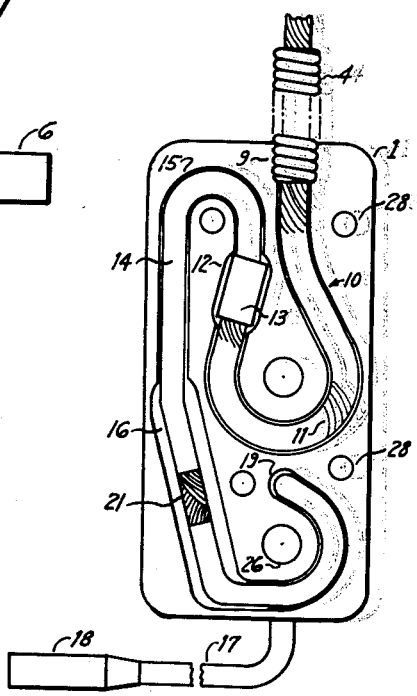
FIG. 2 shows the details of one of the clamping blocks.

If reference is now made to FIG. 2, it will be seen that clamping block 1, the thicker one of the pair, has a threaded, semi-circular passageway at 9 to accept one end of the whip spring 4 and that a hook-shaped groove 10 leading out of this passageway is cut in its face deep enough to accommodate the armored cable length 11. This groove terminates in an enlarged well 12 and, at the cable position corresponding to this well, a length of plastic electrical tape 13 is wrapped about the cable to prevent further unravelling of the steel strands when those strands at the free end of the cable are removed prior to making the electrical splice. By taping the cable, the task of removing the steel strands, of course, is greatly simplified. Moreover, the plastic tape serves to maintain the keystone effect whereby adjacent steel strands of the cable support each other. Without this safeguard there is the possibility that some of these strands may be displaced from their normal position and move inwardly under the compressive force applied to the cable when the clamping blocks are secured together. Any one of these dislocated strands, of course, may fracture or otherwise damage the concentric electrical conductor or conductors and impair the electrical circuit. The unprotected cable 14 exposed when the steel strands are removed fits within a grooved section 15 which leads into a second enlarged well 16. This well houses the electrical splice 21 made between the terminating ends of the towing cable and a jumper cable 17.

The procedure for making the electrical splice is relatively simple. It involves merely soldering corresponding ends of the above conductors together and then completely filling well 16 with a commercial, moldable, non-hardening putty, not shown, such as for example, the "Strip Seal" composition made by the Tremco Manufacturing Company of Cleveland, Ohio. Because of the solid nature of the moldable compound encapsulating splice 21, this electrical connection can withstand extreme pressures without suffering any damage. Furthermore, if any water does enter between the clamping blocks, the waterproof nature of the compound insures the continued integrity of the electrical link between the towed apparatus and the measuring equipment carried, for example, by the surface vessel. It would be noted at this point that since jumper 17 terminates at its other end in a relatively large female plug 18 this cable is first passed through hole 19 in clamping block 1 before the electrical splice is made.

Figure 3:
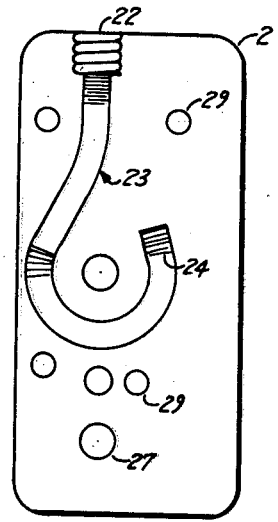
FIG. 3 shows the details of the other clamping block.

The other clamping block 2, as shown in FIG. 3, also has a threaded section cut in one end thereof at point 22 to complement the one formed in block 1. In order to realize the necessary clamping force, this second block is milled to have a hook-shaped, elevated surface 23, this raised surface being a mirror image of the first portion of groove 10 cut in companion block 1. Also, this raised section has its top surface curved as best seen in FIG. 4 in accordance with the diameter of the steel-stranded cable. To increase the holding action, this curved surface is scored with a multiplicity of parallelly spaced cuts 24 which extend perpendicular to the cable direction. The high sections adjacent to the cuts are embedded with a fine abrasive, such as silicon-carbide of about 300 grit. This feature increases the holding action by a factor of two. It will thus be seen that when both clamping blocks are secured together the elevated section 23 extends down below the surface of block 1 and intimately embraces the exposed portion of armored cable 11 and adjacent portions thereof which are completely within groove 10. Consequently, the holding action extends over the complete length of groove 10, and its magnitude is increased both because of the reversal in the direction of cable 11 brought about by the semi-circular portion of channel path 10 and the grit in the grooves previously mentioned. Both of the clamping blocks are also provided with similar apertures 26 and 27 which define the axis about which these blocks can pivot in the towing direction. After the electrical splice is potted with the moldable compound, it is only necessary to clamp both blocks together with a multiplicity of screws, not shown, which pass through clearance holes 29 into threaded apertures 28 to assemble this portion of the apparatus.

The structural details of base member 5 can best be seen in FIG. 5 which is a vertical, cross-sectional view taken along one of its planes of symmetry. From an examination of this figure, it will be recognized that the upstanding posts 7 are separated by an upper slot 30 and a lower cylindrical cut out portion 31. Slot 30 houses the lower portion of the clamping blocks when they are assembled in place by clevis pin 8. This pin, which is of well-known construction, terminates in a bifurcated portion 31 that accommodates a pivotable locking piece 32. The clevis pin is spring-loaded on the head end thereof, the bias spring 33 being partially housed within a bore 34 cut in the outer surface of one of the posts. It would be pointed out at this time that the specific location of the apertures 26 and 27 and the dimensions of slot 30 determine how much the clamping blocks may pivot in the towing direction and that, for example, one corner of these blocks may be cut off at an angle to increase the angular movement available.

On that particular post which has the circular bore cut out, near the base portion thereof, an aperture 35 is cut through at a convenient angle to the cylindrical cutout portion 31. This aperture has a reduced diameter portion 36. The purpose of this aperture is to provide a housing for an electrical connector 37 which has a threaded bushing 38, a concentric solid conductor 39 which is vulcanized or otherwise bonded to the bushing by means of some suitable insulating material 40. This electrical insulation projects beyond the bushing at one side thereof and is shaped to mate with the female terminating end 18 of jumper cable 17. The concentric electrical conductor of this cable likewise terminates in a female ending 42 so that a quick push-pull connection can be made to the base member. A metallic sleeve 43 fits within the enlarged diameter portion of aperture 35 and provides protection for this connection. It would be pointed out that the details of the electrical connector 37 and the jumper cable 17 do not form a part of the present invention and that these components are made by the Joy Manufacturing Company of St. Louis, Missouri.

It would be appreciated from an examination of FIG. 5 that base member 5 is secured to the towing apparatus by means of suitable screws, not shown, which pass through clearance holes 45 cut in the flanged portion of this component. This flanged portion also has on its bottom surface a circular groove 46 for making an O ring seal to the towing apparatus. The electrical signal output from this apparatus is coupled to the end of the concentric conductor 39 which extends into the waterproof cylindrical cutout space 31.

It would be noted in connection with the arrangement of FIG. 1 that electrical jumper 17, by design, emerges from clamping block 1 and passes directly over the head of clevis pin 8 before it proceeds to the male end of plug 37. With this cable arrangement, clevis pin 8 cannot be removed or an attempt made to withdraw the clamping blocks from the base member until jumper 17 is detached from male plug 37. Thus, there is little danger of of the towing apparatus being still connected to the towing cable via this jumper alone when, for example, the towing cable is being wound at relatively great speeds on a winch. Furhermore, since the jumper is brought out of the clamping block near the pivot point of this block and in a line perpendicular to its plane of rotation, the least amount of angular flexing is experienced by this jumper. Hence, its serviceable use is prolonged. Also, the upper portion of post 7 is formed with a central projection 47 which further minimizes the wear of the jumper as it moves over this surface in response to the pivoting action of the clamping blocks.

It will be appreciated that the method disclosed above for making the waterproof electrical cable splice, which involves encapsulating the splice with a moldable, waterproof compound retained within a single well or a pair of cooperating wells formed in confronting faces of a pair of retaining plates, constitutes an important advantage of the present invention. Such a technique, of course, has general application and may be profitably used wherever it is desirable to form an underwater splice in an electric cable without resorting to gaskets and other forms of water-sealing devices to prevent the intrusion of water into the electrical line. Also, in the case where the splice is to be made at an intermediate point in the towing line, the armored cable ends on both sides of the splice can be effectively secured to the retaining plate by means of hook-shaped surfaces of the type above described. The use of such plates with two similar hook-shaped raised and/or grooved surfaces would permit an electrical instrument to be connected any place along the towing line without destroying its capacity to withstand relatively high towing forces. The tension in such an arrangement is removed from the cable at the point where the splice is made and, in effect, transferred to the plates.

Obviously many modifications and variations of the present invention are possible in the light of the above teachings. It is therefore to be understood that within the scope of the appended claims the invention may be practiced otherwise than as specifically described.

What is claimed is:

1. For use in a quick disconnect cable clamp for armor-covered electrical towing cables, the subcombination of first and second plates, a cable groove cut in one face of said first plate, said cable groove being hook-shaped with the upright portion thereof terminating at one edge of said first plate and with the curved portion terminating in an enlarged groove, a well cut in said one face of said first plate, an aperture extending from said one face of said first plate to an opposite face thereof and a first cable slot connecting the end of the curved portion of said hook-shaped groove to said well, a second cable slot connecting said well to said aperture, said second plate having an arcuated surface projecting from one face thereof, said arcuated surface having a configuration which is a mirror image of said cable groove whereby said raised surface dovetails into said cable groove when said first and second plates are secured together with said one faces contacting each other, an armor-covered electrical cable, one end of said cable having the armored covering removed therefrom, said cable being disposed within said cable groove such that the portion thereof which has the armored covering removed therefrom is accommodated within said first cable slot with one end of said armored cable extending into said well, a jumper cable, a portion of said jumper cable being accommodated within said second cable slot with one end of said jumper cable extending into said well, said one end of said armored cable and said one end of said jumper cable being connected in an electrical splice, means for securing said first and second plates together with said one faces contacting each other and with said raised surface dovetailing into said cable groove, and a moldable, waterproof compound disposed within said first well and encapsulating said electrical splice.

2. A cable clamp for use with electrical cables comprising, in combination, a first plate having a first cable groove formed in one planar face thereof, a well cut in said face, said cable groove extending from one edge of said plate and reversing direction at least once before terminating at said well, a second plate, said second plate having a planar face with a raised portion projecting therefrom, said raised portion having a configuration which is a mirror image of a length of said cable groove, a first cable having a length thereof accommodated within said first cable groove with an end portion thereof extending into said well, an aperture passing through said first plate from said one face to an opposite face, a second cable groove formed in the planar surface of said first plate, said second cable groove connecting said aperture to said well, a second cable, said second cable passing through said aperture and having a length thereof accommodated within said second cable groove with an end portion extending into said well, said end portions of said first and second cables being joined in an electrical splice, a putty-like material disposed within said well and encapsulating said splice and means for securing said first and second plates together with their planar faces contacting each other and with the raised portion of said second plate dovetailing partially into a corresponding length of said first cable groove whereby said first cable is clamped to said first and second plates.

3. In an arrangement as defined in claim 2 wherein said raised portion which projects from said second plate has a concave surface whose curvature is related to that of said first cable.

4. In an arrangement as defined in claim 3 wherein said concave surface is scored with spaced grooves and a grittylike substance is disposed within said grooves to increase the friction between said first cable and said plates when said plates are secured together.

References Cited by the Examiner

UNITED STATES PATENTS

| 2,400,310 | 5/46 | Lobelle | 174—70 |
| 2,602,206 | 7/52 | Rishel | 24—123.6 X |
| 2,810,115 | 10/57 | Abbott | 174—92 X |
| 3,022,485 | 2/62 | Buchanan | 339—175 |

LARAMIE E. ASKIN, *Primary Examiner.*

JOHN P. WILDMAN, E. JAMES SAX, *Examiners.*